Sept. 18, 1923.  O. ELSWORTH  1,468,011
MEANS FOR STRIPPING THE HUSKS FROM COCONUTS
Filed April 2, 1923   3 Sheets-Sheet 1

INVENTOR
OSWALD ELSWORTH,
By Toulmin & Toulmin
Attorneys

Sept. 18, 1923.　　　　　　　　　　　　　　　　　　　　　1,468,011
O. ELSWORTH
MEANS FOR STRIPPING THE HUSKS FROM COCONUTS
Filed April 2, 1923　　　　　3 Sheets-Sheet 2

INVENTOR
OSWALD ELSWORTH,
By Toulmin & Toulmin,
Attorneys

Sept. 18, 1923.

O. ELSWORTH 1,468,011

MEANS FOR STRIPPING THE HUSKS FROM COCONUTS

Filed April 2, 1923   3 Sheets-Sheet 3

INVENTOR
OSWALD ELSWORTH,
By Toulmin & Toulmin,
Attorneys

Patented Sept. 18, 1923.

1,468,011

UNITED STATES PATENT OFFICE.

OSWALD ELSWORTH, OF NEWCASTLE-UPON-TYNE, ENGLAND.

MEANS FOR STRIPPING THE HUSKS FROM COCONUTS.

Application filed April 2, 1923. Serial No. 629,291.

*To all whom it may concern:*

Be it known that I, OSWALD ELSWORTH, a subject of the King of Great Britain and Ireland, residing at Old Benwell, in the city and county of Newcastle-upon-Tyne, England, have invented certain new and useful Improvements in Means for Stripping the Husks from Coconuts, of which the following is a specification, reference being had therein to the accompanying drawing.

This invention relates to means for stripping the husks from coconuts. Hitherto, largely owing to the great variation in the size of the husked nuts and in the thickness of their husks, it has been necessary to remove the husk from the nuts by hand tools which is slow and laborious work. The object of my invention is to provide practical and effective machinery whereby the nuts can be rapidly stripped of their husks without breaking the internal shell.

Machinery in accordance with my invention comprises means for loosening and tearing apart the fibres of the husk and for removing the loosened husk from the nut. The means for loosening the husk comprises alternate series of fixed and traveling teeth coacting with a floating pressure member disposed adjacent thereto. The husked nuts are fed in between the series of teeth and the pressure member, and the teeth enter the husks and tear the fibres thereof apart, the resilient pressure between the floating pressure member and the teeth being adjusted so that, while the teeth penetrate the husk, the pressure is not sufficient to cause them to crack the internal shell. In one arrangement the nuts are discharged with their husks still adhering but in a loosened state, and the nuts are subsequently subjected to the action of coacting plain and spiral-threaded rollers which seize the loosened husk and tear it from the nut. In another arrangement, the loosened husk is torn from the nut before it is discharged from between the teeth and pressure member.

Figure 1:
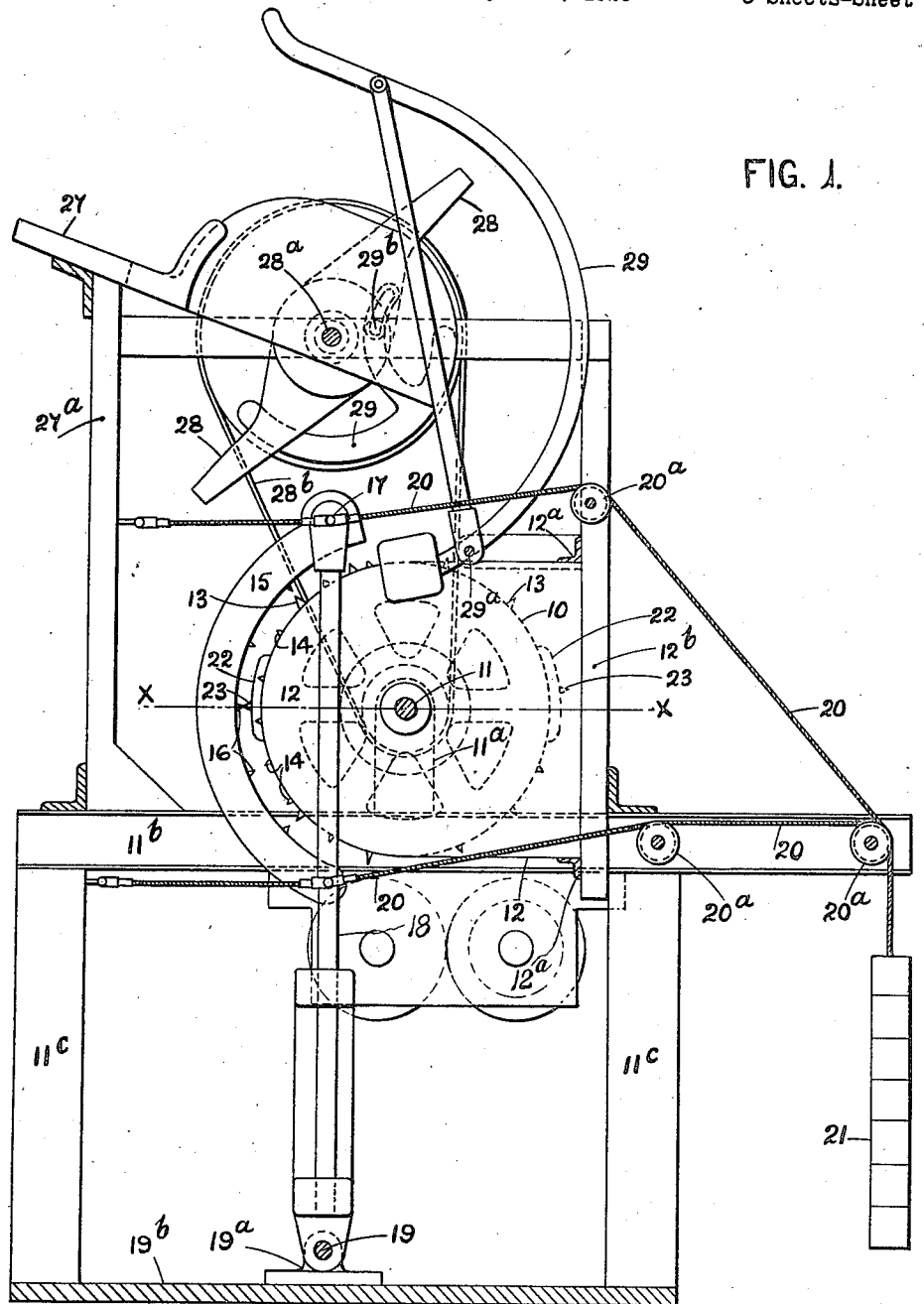
Figure 2:
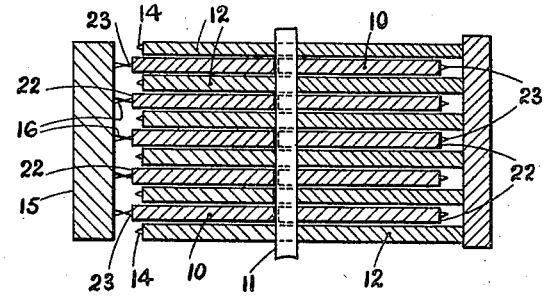
Figure 3:
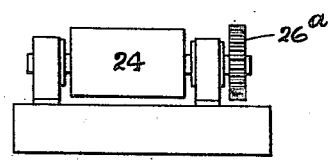
Figure 4:
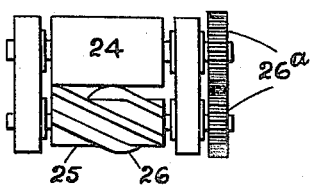
Figure 7:
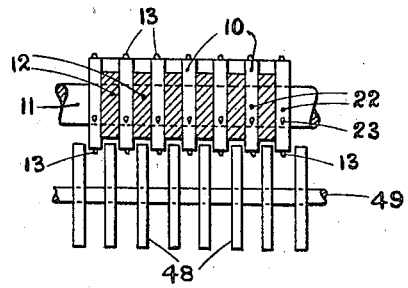
Figures 5, 6:
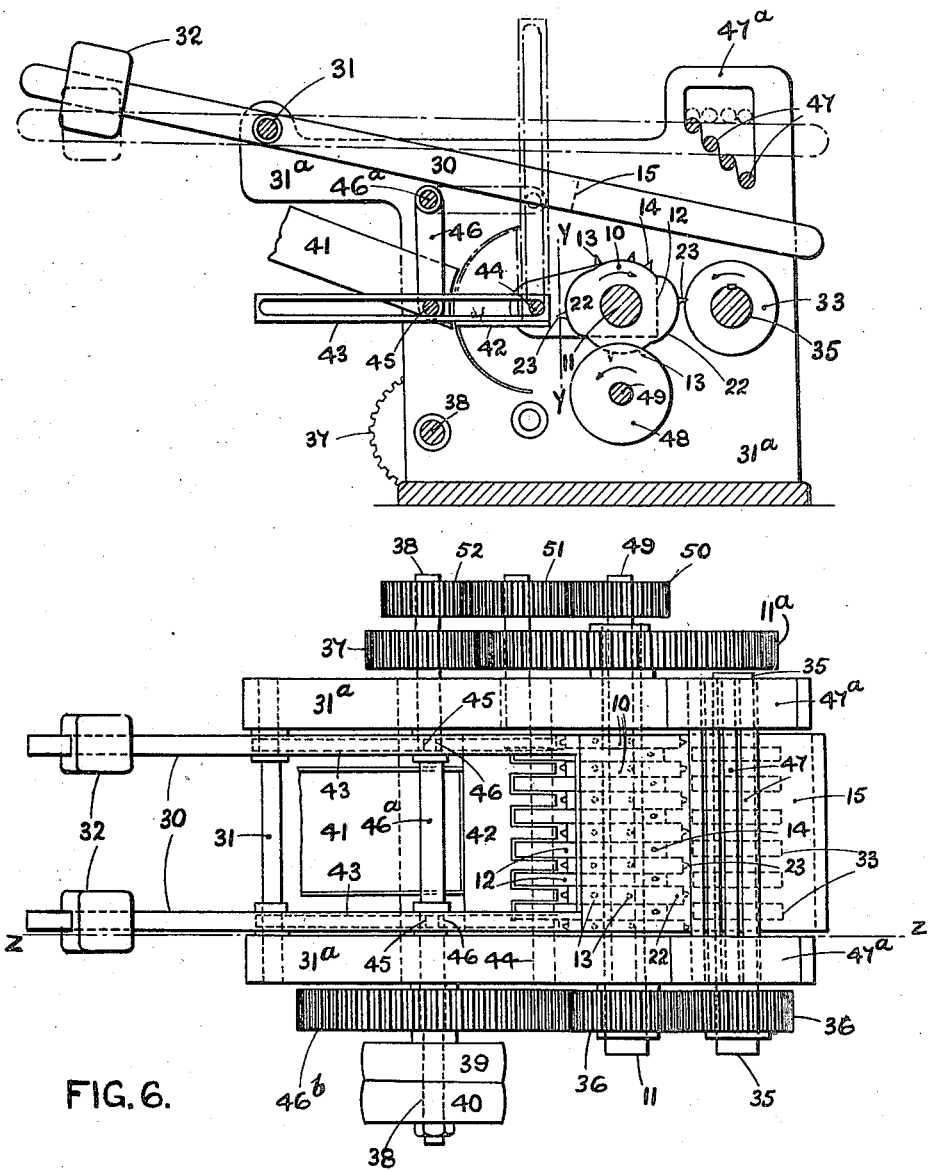

I will fully describe my invention with reference to the accompanying drawings wherein Figure 1 is an elevation of one construction of machine for loosening the fibres of the husks of the nuts in accordance with my invention, and Figure 2 is a part plan section on the line X—X in Fig. 1. Figures 3 and 4 are an elevation and a plan respectively of the rollers for removing the loosened husks from the nuts. Figures 5 and 6 are an elevation on the line Z—Z in Fig. 6 and a plan respectively of a modified construction of the machine wherein the husk-removing means are combined with the husk-loosening means, and Figure 7 is a section on the line Y—Y in Fig. 5 looking to the right.

Referring first to Figs. 1 and 2 of the drawings, the machine therein illustrated comprises a series of discs 10 keyed to a power-driven rotary shaft 11 and alternating with fixed plates 12. The shaft 11 is mounted in bearings $11^a$ carried by iron girders $11^b$ supported by columns $11^c$ at each side of the machine, and the plates 12 are attached by angles $12^a$ to uprights $12^b$ carried by the girders $11^b$. The rotating discs have teeth 13 around their peripheries, and the fixed plates 12 have teeth 14 around the curved portions of their edges which are in alignment with the peripheries of the discs 10. Adjacent to said rotary discs and fixed plates is a floating pressure member comprising a segmental block 15 having a concave face provided with teeth 16 coacting with the teeth 13 and 14, said floating pressure member 15 being pivoted at 17 to a standard 18 pivoted at 19 in a bearing $19^a$ on the base plate $19^b$ of the machine so that said pressure member can move freely toward and away from the discs 10 and plates 12 but not laterally thereof. The movements of the pressure member 15 are resiliently controlled by flexible connections 20 passing over pulleys $20^a$ supported by the frames $11^b$ and $12^b$ to an adjustable weight 21 whereby the resilient pressure upon the nuts can be regulated. The pressure member is arranged to exert a uniform pressure on the husks of the nuts during their passage, and the resilient mounting of the pressure member allows it to automatically adjust itself to various sizes of nuts and thicknesses of husks.

The rotary discs 10 are provided around their peripheries with one or more cams 22 or the like for the purpose of preventing a nut sticking during its passage between the discs and the pressure member 15, said cams operating to raise the nut clear of the fixed teeth 14 and allow the nut to be passed on by the rotary teeth 13. To facilitate this, the cams may have small teeth 23 at their highest points.

I have obtained the best effects by making the rotary teeth 13 somewhat larger than the fixed teeth 14 and the teeth of the pressure member 15, and arranging the points and cutting edges of the rotary teeth 13 so that they oppose the points and cutting edges of the fixed teeth 14. The effect of the coacting teeth 13, 14 and 16 is to rend the husk of the nut lengthwise and loosen it from the nut.

Upon discharge from between the rotary discs 10 and pressure member 15, the nut with its loosened husk adhering to it is subjected to the action of a pair of coacting rollers. These rollers are illustrated in Figs. 3 and 4. One roller 24 is plain and the other roller 25 is provided with spiral threads 26. The rollers are set close together and their spindles are provided with equal interengaging pinions 26ᵃ which are suitably driven so that the rollers rotate at equal speeds in opposite directions. They coact to seize the loosened husk and tear it from off the nut while the nut revolves on the top of the rollers but does not pass between them. The rollers may be adjustable relatively, or one or both rollers may be resiliently mounted so as to accommodate an extra thick piece of fibre.

Means such as elevators and conveyors of suitable construction may be arranged to deliver the husked nuts between the rotary discs 10 and the pressure member 15 one by one preferably with their greater axes across the direction of travel. For example, the nuts may be fed down a slide 27 supported by uprights 27ᵃ carried by the girders 11ᵇ, the nuts being picked up one by one by arms 28 on a shaft 28ᵃ in bearings supported by cross girders 28ᵇ at each side of the machine carried by the uprights 12ᵇ and 27ᵃ. The shaft 28ᵃ is rotated by a belt 28ᶜ from the shaft 11. The arms 28 deliver the nuts between floating guides 29 pivoted at 29ᵃ and 29ᵇ respectively which lead the nuts between the pressure member 15 and the rotary discs 10. Slides or conveyors may be also arranged to deliver the nuts to the rollers 24, 25 as they are discharged from between the pressure member 15 and the rotary discs 10, said rollers being conveniently disposed at a lower level than the discs 10, and to convey the stripped nuts and the husk separately away from the machine.

In the modified husk-stripping machine illustrated in Figs. 5 to 7, the rotary discs 10 are much reduced in diameter but are provided with teeth 13 and cams 22 having teeth 23 as and for the purposes hereinbefore described. The fixed plates 12 are correspondingly reduced in size, and are each provided with a single tooth 14. The pressure member, in this example, comprises a plate 15 carried by side arms 30 pivoted on a spindle 31 supported by the side frames 31ᵃ of the machine, the arms 30 having adjustable weights 32 at their other ends. In place of the separate rollers 24, 25, I employ a series of rotary discs 33 disposed in alignment with the fixed plates 12 on a shaft 35 parallel with the shaft 11 and rotated at the same speed as, but in the opposite direction to said shaft 11. The shafts 11 and 35 are mounted in bearings carried by the side frames 31ᵃ and are geared together by pinions 36, and the shaft 11 is driven through a spur wheel 11ᵃ driven by a pinion 37 on a shaft 38 in bearings carried by the side frames 31ᵃ and provided with fast and loose pulleys 39, 40. If desired the discs 33 may be provided with flats around their peripheries.

The husked nuts are fed down a slide 41 and are picked up one by one by a pusher plate 42 carried by slotted arms 43 pivoted at 44 and oscillated (as indicated in dot-and-dash lines in Fig. 5) through about 90° by a pin 45 on an arm 46 on a shaft 46ᵃ driven by the pinion 36 on the shaft 11 through a spur wheel 46ᵇ. The plate 42 feeds the nuts between the pressure member 15 and the discs 10, the member 15 exerting floating pressure upon the nuts in proportion to their size, said proportional increase of pressure being obtained by providing a number of transverse rods 47 supported at different heights in stepped recesses in lugs 47ᵃ on the side frames 31ᵃ and adapted to be successively picked up by the plate 15 as it rises so that the weight of the rods 47 is progressively added to the weight of the plate 15. The highest position of the member 15 is indicated in dot-and-dash lines in Fig. 5.

Each nut is pressed by the pressure member 15 onto the fixed teeth 14 while the rotary teeth 13 pierce and loosen the fibres of its husk. The cams 22 raise the nut off the teeth 14 and the nut is partially revolved to bring a fresh portion of its husk over the teeth 14 onto which the husk is again forced so soon as the cam 22 passes. Simultaneously the rotary discs 33 coacting with the toothed discs 10 and fixed plates 12 tear the loosened husk from off the nut and pass it down between said discs and the discs 10, the nut riding on said discs and not passing down between them. The discs 33 act as abutments against which the nut is steadied while the rotary teeth 13 act upon it. The stripped nut is discharged by the next nut which, as it is fed by the pusher plate 42 between the floating pressure member 15 and the rotary discs 10, pushes the previous nut out at the right-hand end of the machine. To remove any husk which may adhere to the teeth 13 on the discs 10, fast-running rotary discs 48, preferably having their peripheries roughened, are provided below the discs 10. The spindle 49 carrying the discs 48 is driven through toothed gearing 50, 51, 52 from the shaft 38.

What I claim as my invention, and desire to secure by Letters Patent is:—

1. Means for stripping the husks from coconuts comprising alternate series of fixed and travelling teeth whereby the fibres of the husks are loosened and torn apart, a floating pressure member disposed adjacent to said teeth and coacting therewith whereby the nuts are pressed onto the teeth, and means for removing the loosened husks from the nuts.

2. Means for stripping the husks from coconuts comprising teeth carried by fixed plates, rotary discs alternating therewith, teeth carried thereby, a floating pressure member mounted adjacent to said rotary discs, said member having a concave face next said discs provided with teeth, the teeth of the fixed plates, rotary discs and floating pressure member coacting to loosen and tear apart the fibres of the husks of the nuts, and means for feeding the nuts one by one between said rotary discs and floating pressure member.

3. Means for stripping the husks from coconuts comprising teeth carried by fixed plates, rotary discs alternating therewith, teeth carried thereby, cams around the peripheries of said rotary discs, a floating pressure member mounted adjacent to said rotary discs, said member having a concave face next said discs provided with teeth, the teeth of the fixed plates, rotary discs and floating pressure member coacting to loosen and tear apart the fibres of the husks of the nuts, and means for feeding the nuts one by one between said rotary discs and floating pressure member.

4. Means for stripping the husks from coconuts comprising teeth carried by fixed plates, rotary discs alternating therewith, teeth carried thereby, cams around the peripheries of said rotary discs, a floating pressure member mounted adjacent to said rotary discs, said member having a concave face next said discs provided with teeth, the teeth of the fixed plates, rotary discs and floating pressure member coacting to loosen and tear apart the fibres of the husks of the nuts, means for feeding the nuts one by one between said rotary discs and floating pressure member, and coacting plain and spiral-threaded rollers adapted to seize the loosened husks and tear them from the nuts.

5. Means for stripping the husks from coconuts comprising fixed teeth alternating with series of travelling teeth whereby the fibres of the husks are loosened and torn apart, a floating pressure member disposed adjacent to said teeth and coacting therewith whereby the nuts are pressed onto the teeth, rotary members coacting with said travelling teeth to tear the loosened husks from the nuts before they are discharged from between the travelling teeth and pressure member, and travelling cams for raising the nuts from off the fixed teeth and partially rotating the nuts to bring fresh portions of their husks over the fixed teeth.

6. Means for stripping the husks from coconuts comprising fixed teeth alternating with series of travelling teeth whereby the fibres of the husks are loosened and torn apart, a floating pressure member disposed adjacent to said teeth and coacting therewith whereby the nuts are pressed onto the teeth, rotary members coacting with said travelling teeth and pressure member, travelling cams for raising the nuts from off the fixed teeth and partially rotating the nuts to bring fresh portions of their husks over the fixed teeth, and means for feeding the nuts one by one between said teeth and the floating pressure member.

7. Means for stripping the husks from coconuts comprising fixed teeth alternating with series of travelling teeth whereby the fibres of the husks are loosened and torn apart, a floating pressure member disposed adjacent to said teeth and coacting therewith whereby the nuts are pressed onto the teeth, rotary members coacting with said travelling teeth and pressure member, travelling cams for raising the nuts from off the fixed teeth and partially rotating the nuts to bring fresh portions of their husks over the fixed teeth, means for feeding the nuts one by one between said teeth and the floating pressure member, and means for proportionally increasing the floating pressure exerted by the pressure member according to the size of the nuts.

8. Means for stripping the husks from coconuts comprising alternate series of fixed and traveling teeth whereby the fibres of the husks are loosened and torn apart, an element arranged to hold the coconut in contact with the teeth, and means for removing the loosened husks from the nuts.

9. In a device of the kind described, means for loosening the husks from coconuts comprising alternate fixed and rotary plates provided with peripheral teeth, a guide adjacent said discs for holding the coconut in contact therewith, and means for feeding the nuts one by one between the plates and the guide.

In testimony whereof, I affix my signature.

OSWALD ELSWORTH.